(12) United States Patent
Hoy et al.

(10) Patent No.: US 10,834,100 B2
(45) Date of Patent: *Nov. 10, 2020

(54) DYNAMICALLY DEFINED VIRTUAL PRIVATE NETWORK TUNNELS IN HYBRID CLOUD ENVIRONMENTS

(71) Applicant: International Business Machines Corporation, Armonk, NY (US)

(72) Inventors: Jeffrey R Hoy, Southern Pines, SC (US); Sreekanth R Iyer, Bangalore (IN); Kaushal K Kapadia, Pune (IN); Ravi K Muthukrishnan, Bangalore (IN); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,360

(22) Filed: Oct. 28, 2019

(65) Prior Publication Data

US 2020/0067877 A1   Feb. 27, 2020

Related U.S. Application Data

(63) Continuation of application No. 16/159,678, filed on Oct. 14, 2018, now Pat. No. 10,505,904, which is a
(Continued)

(51) Int. Cl.
*H04L 29/06*   (2006.01)

(52) U.S. Cl.
CPC ........ *H04L 63/1408* (2013.01); *H04L 63/029* (2013.01); *H04L 63/0272* (2013.01); *H04L 63/102* (2013.01); *H04L 63/164* (2013.01)

(58) Field of Classification Search
None
See application file for complete search history.

(56) References Cited

U.S. PATENT DOCUMENTS 6,473,863 B1   10/2002   Genty
8,892,766 B1   11/2014   Wei
(Continued)

FOREIGN PATENT DOCUMENTS

CN   1412973 A    4/2003
CN   101091371 A  1/2005
(Continued)

OTHER PUBLICATIONS

Javaid, Zeeshan and Imran Ijaz, "Secure user authentication in cloud computing", Information & Communication Technologies (ICICT), 2013 5th International Conference on, IEEE, 2013 (pp. 1-5).
(Continued)

*Primary Examiner* — Andrew J Steinle
(74) *Attorney, Agent, or Firm* — Jeffrey S LaBaw; Diana Gerhardt; John C Kennel

(57) ABSTRACT

A method, apparatus and computer program product for managing a plurality of VPN tunnels between a first cloud and a second cloud in a hybrid cloud environment is described. In a first virtual private network (VPN) manager a request is received from a first cloud application resident in the first cloud. The request includes a first set of requirements for a first VPN tunnel in the plurality of VPN tunnels. The VPN manager sends a first VPN manager request to a first system in a first cloud, wherein the first system creates the first VPN tunnel according to the first set of requirements. The VPN manager receives a request from a second cloud application resident in the first cloud. The request includes a second set of requirements for a VPN tunnel in the plurality of VPN tunnels. The VPN manager sends a second
(Continued)

VPN manager request to the system in a first cloud, wherein the second VPN manager request contains the second set of requirements. The second VPN manager request is either tuning the first VPN tunnel according to both the first and second set of requirements if the first and second requirements are compatible or creating a second VPN tunnel between the first node and the second node if the first and second requirements are not compatible, the second VPN tunnel created by the first system.

20 Claims, 11 Drawing Sheets

Related U.S. Application Data continuation of application No. 14/970,507, filed on Dec. 15, 2015, now Pat. No. 10,142,293.

(56) References Cited

U.S. PATENT DOCUMENTS

| | | | |
|---|---|---|---|
| 8,990,901 | B2 | 3/2015 | Aravindakshan |
| 9,154,327 | B1 | 10/2015 | Marino |
| 2002/0093915 | A1 | 7/2002 | Larson |
| 2003/0016679 | A1 | 1/2003 | Adams |
| 2005/0088977 | A1* | 4/2005 | Roch ............... H04L 47/31 |
| | | | 370/254 |
| 2006/0245362 | A1* | 11/2006 | Choyi ............ H04W 12/0401 |
| | | | 370/238 |
| 2006/0245363 | A1 | 11/2006 | Ravindran |
| 2008/0117821 | A1 | 5/2008 | Asati |
| 2010/0027552 | A1 | 2/2010 | Hill |
| 2010/0154050 | A1 | 6/2010 | Mukkara |
| 2012/0284408 | A1 | 11/2012 | Dutta |
| 2013/0227641 | A1 | 8/2013 | White |
| 2013/0283364 | A1 | 10/2013 | Chang |
| 2013/0298182 | A1 | 11/2013 | May |
| 2013/0298201 | A1 | 11/2013 | Aravindakshan |
| 2013/0311778 | A1* | 11/2013 | Cherukuri ........... H04L 63/0272 |
| | | | 713/171 |
| 2014/0040984 | A1 | 2/2014 | Mackler |
| 2014/0109175 | A1 | 4/2014 | Barton |
| 2014/0337528 | A1 | 11/2014 | Barton |
| 2014/0372761 | A1 | 12/2014 | Cherukuri |
| 2015/0009038 | A1 | 1/2015 | Trossbach |
| 2015/0052523 | A1 | 2/2015 | Raghu |
| 2015/0067112 | A1 | 3/2015 | Gokhale |
| 2015/0096011 | A1 | 4/2015 | Watt |
| 2015/0277402 | A1 | 10/2015 | Heine |
| 2015/0372982 | A1* | 12/2015 | Herle ................. H04L 63/0272 |
| | | | 726/15 |
| 2016/0105456 | A1 | 4/2016 | Thakkar |
| 2016/0105488 | A1 | 4/2016 | Thakkar |

FOREIGN PATENT DOCUMENTS

| | | |
|---|---|---|
| CN | 104753752 A | 12/2013 |
| EP | 1657885 B1 | 3/2011 |
| JP | 2003124986 A | 4/2003 |
| JP | 2005269009 A | 9/2005 |
| JP | 2006262131 A | 9/2006 |
| JP | 2013229924 A | 11/2013 |
| JP | 2015522996 A | 8/2015 |

OTHER PUBLICATIONS

Fouquet, Marc, Heiko Niedermayer and Georg Carle, "Cloud computing for the masses", Proceedings of the 1st ACM workshop on User-provided networking: challenges and opportunities, ACM 2009, (pp. 31-36).
List of IBM Patents or Patent Applications Treated as Related.

* cited by examiner

DYNAMICALLY DEFINED VIRTUAL PRIVATE NETWORK TUNNELS IN HYBRID CLOUD ENVIRONMENTS

BACKGROUND OF THE INVENTION

Technical Field

This disclosure relates generally to communications in a "cloud" computing environment. More particularly, it relates to dynamically creating virtual private network tunnels in a hybrid cloud environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud computing resources are typically housed in large server farms that run network applications, either using a hardware architecture, so-called bare metal cloud hosting, or using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

It is known for an organization to arrange computing resources in a hybrid cloud environment, containing both a private cloud in which the computing resources are owned by the organization and provide services only for that organization, and a public cloud in which another organization provides computing services for a plurality of "tenants" including the organization operating the hybrid cloud. One benefit of a hybrid cloud model is having on-premises, private infrastructure that is directly accessible, while providing access to the public cloud environment in times of high demand. With this integration, however, there is a need for secure communication between the two environments. One way in which communications are established is through a dedicated virtual public network (VPN) tunnel.

The disclosure below details ways to improve VPN communication in a hybrid cloud environment.

BRIEF SUMMARY

According to this disclosure, a method, apparatus and computer program product for managing a plurality of VPN tunnels between a first cloud and a second cloud in a hybrid cloud environment is described. In a first virtual private network (VPN) manager a request is received from a first cloud application resident in the first cloud. The request includes a first set of requirements for a first VPN tunnel in the plurality of VPN tunnels. The VPN manager sends a first VPN manager request to a first system in a first cloud, wherein the first system creates the first VPN tunnel according to the first set of requirements. The VPN manager receives a request from a second cloud application resident in the first cloud. The request includes a second set of requirements for a VPN tunnel in the plurality of VPN tunnels. The VPN manager sends a second VPN manager request to the system in a first cloud, wherein the second VPN manager request contains the second set of requirements. The second VPN manager request is either tuning the first VPN tunnel according to both the first and second set of requirements if the first and second requirements are compatible or creating a second VPN tunnel between the first node and the second node if the first and second requirements are not compatible, the second VPN tunnel created by the first system.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Hybrid cloud environments drive the need for secure communication between applications between different cloud hosting environments. As the number of applications and platforms grows, the number of communication paths which need to be secured grows rapidly. Today, customers often install dedicated VPNs to bridge between different clouds in the hybrid cloud environments, but dedicated VPNs drag along a number of drawbacks, including limited flexibility and creating a large communication hole (by opening up the firewall to allow communication) in environments that need to be secured. For a highly-granular requirement like event management across a hybrid cloud environment, small logs may be sent from a plethora of devices to a central server, yet traditional VPN options require wide communication channels to be opened between the source devices and the central server far in excess of that which is required to transmit the small amount of data. The present invention provides a means to provide more highly tuned VPNs based on application requirements and topology requirements for the hybrid cloud environment than prior art solutions.

A "hybrid cloud environment" is a cloud environment which contains both a private cloud in which the computing resources are owned by the organization and provide services only for that organization, and a public cloud in which another organization provides computing services for a plurality of "tenants" including the organization.

A "node" can be any electronic device, client, server, peer, service, application, or other object capable of sending, receiving, or forwarding information over communications channels in a network.

A "VPN agent" is an application which manages a VPN tunnel at one of the two nodes which are endpoints of the tunnel.

A "VPN manager" is a cloud application which manages an infrastructure of VPN tunnels in the hybrid cloud environment. In preferred embodiments, the VPN Manager also manages an infrastructure of VPN agents which in turn manage respective VPN tunnels.

A "VPN tunnel" is a communications channel between two nodes that transports data by encapsulating the data's Internet Protocol (IP) packets according to any suitable cryptographic tunneling protocol.

Figure 1:
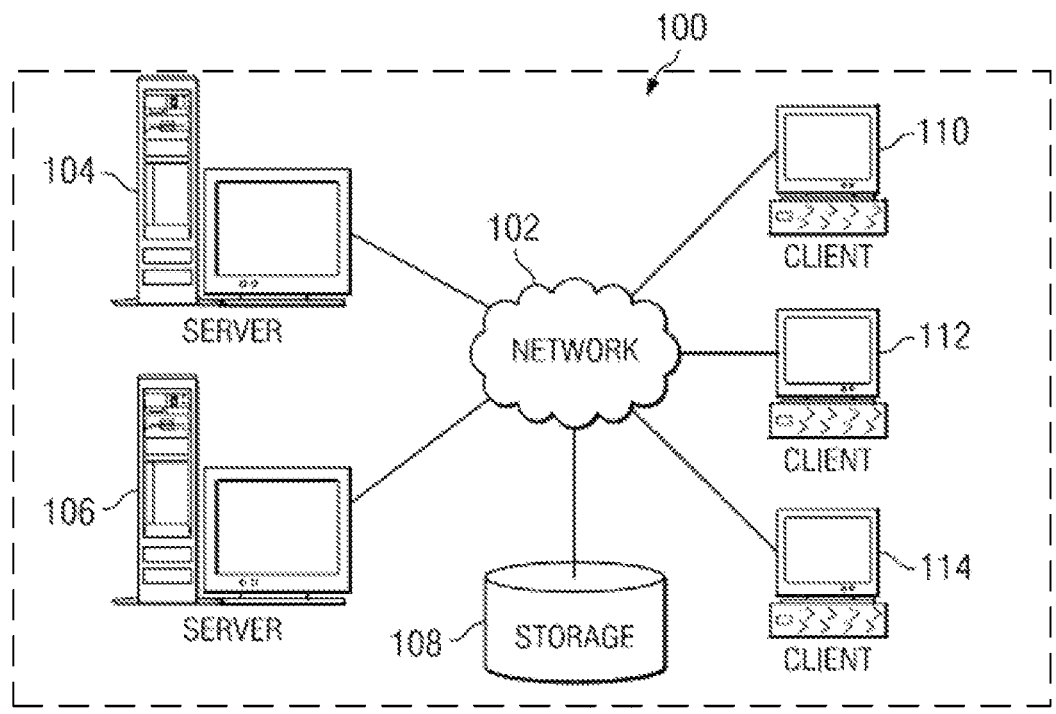
FIG. 1 depicts an exemplary block diagram of a distributed data processing environment in which exemplary aspects of the illustrative embodiments may be implemented.
Figure 2:
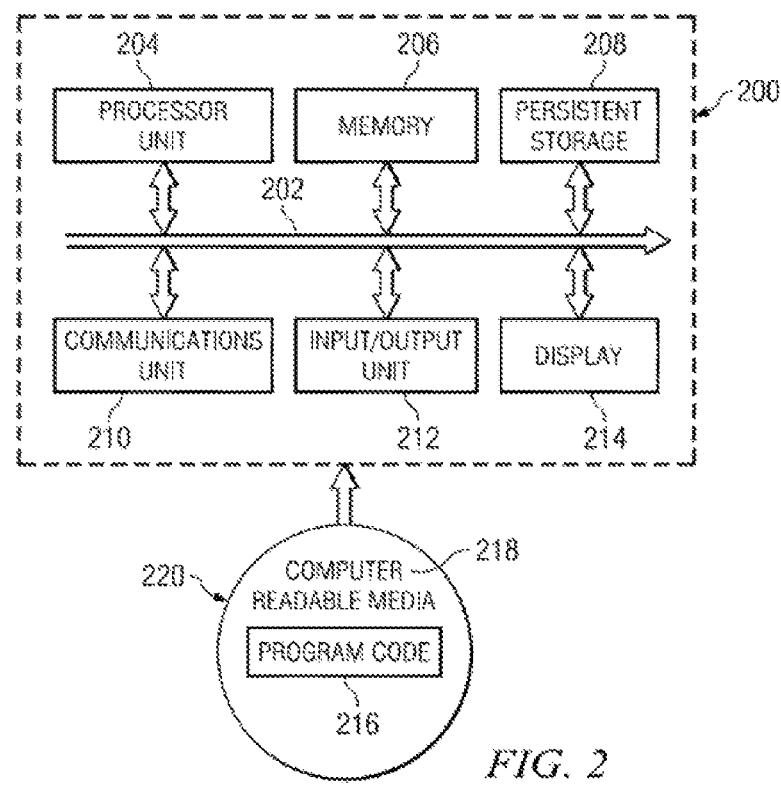
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++, C #, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
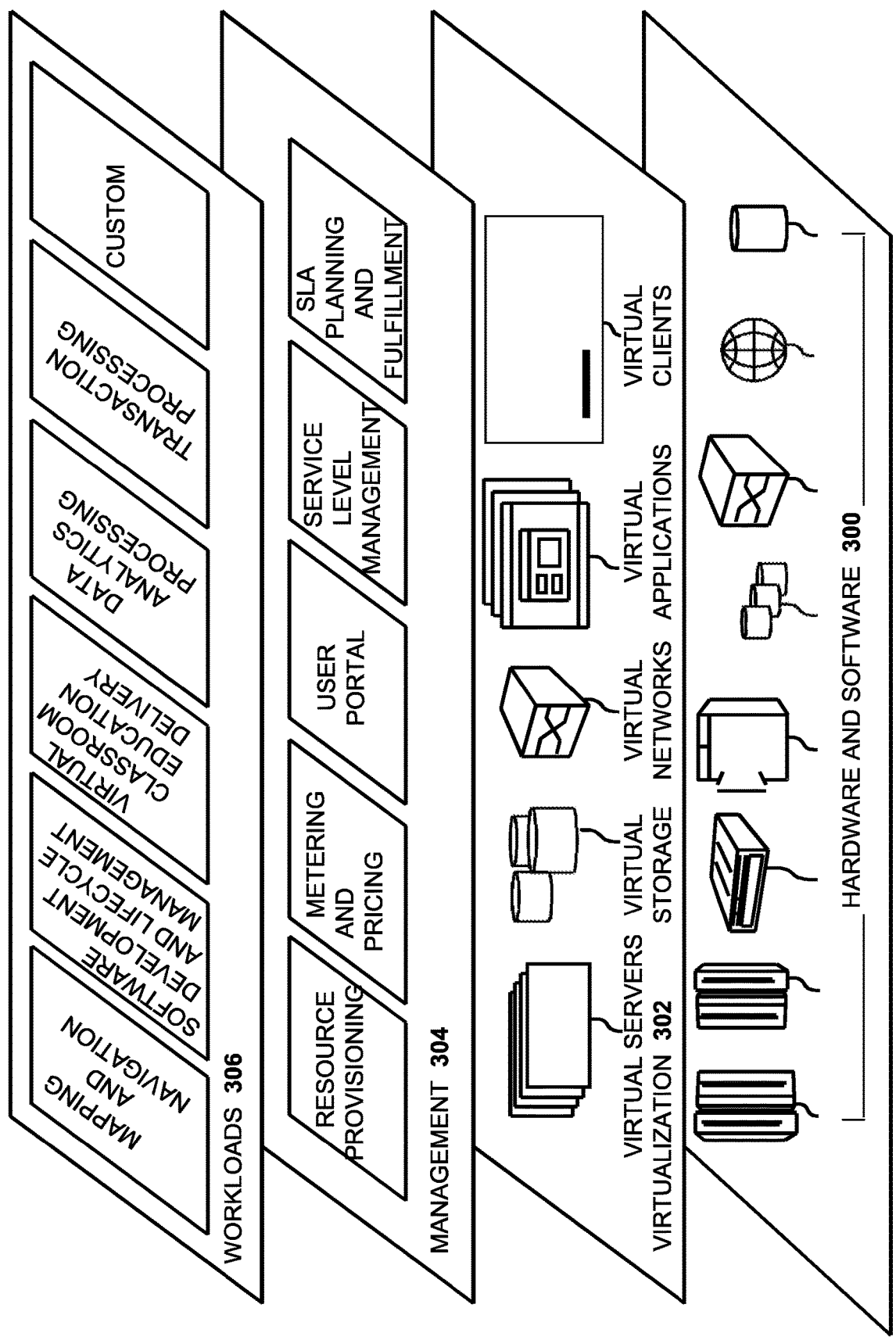
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide) Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Hybrid cloud environments drive the need for secure communication between applications between different hosting environments. As the number of applications and platforms grows, the number of secure communication paths grows rapidly. Prior art dedicated VPNs create large communication channels in environments that need to be secured. Many transmission needs are highly-granular requirements, such as event management, wherein log data is sent from many devices to a central server; traditional VPN use wide communication channels which are unneeded and pose security risks. Other examples of applications which transmit small amounts of data between clouds include applications trying to sync data on a periodic basis, e.g., once in a month, or monitoring applications which send regular but small amounts of data.

Prior art software VPNs can partially solve this problem by creating communication paths for particular applications or particular clouds, however, application-based solutions generally apply only to a single application, can be hard to manage, can be hard to monitor, and do not take advantage of efficiency of scale.

The present invention includes embodiments that dynamically deploy and reconfigure highly-tuned VPNs based on application requirements from multiple applications and provide optimal topologies for the hybrid cloud environments.

Figure 4:
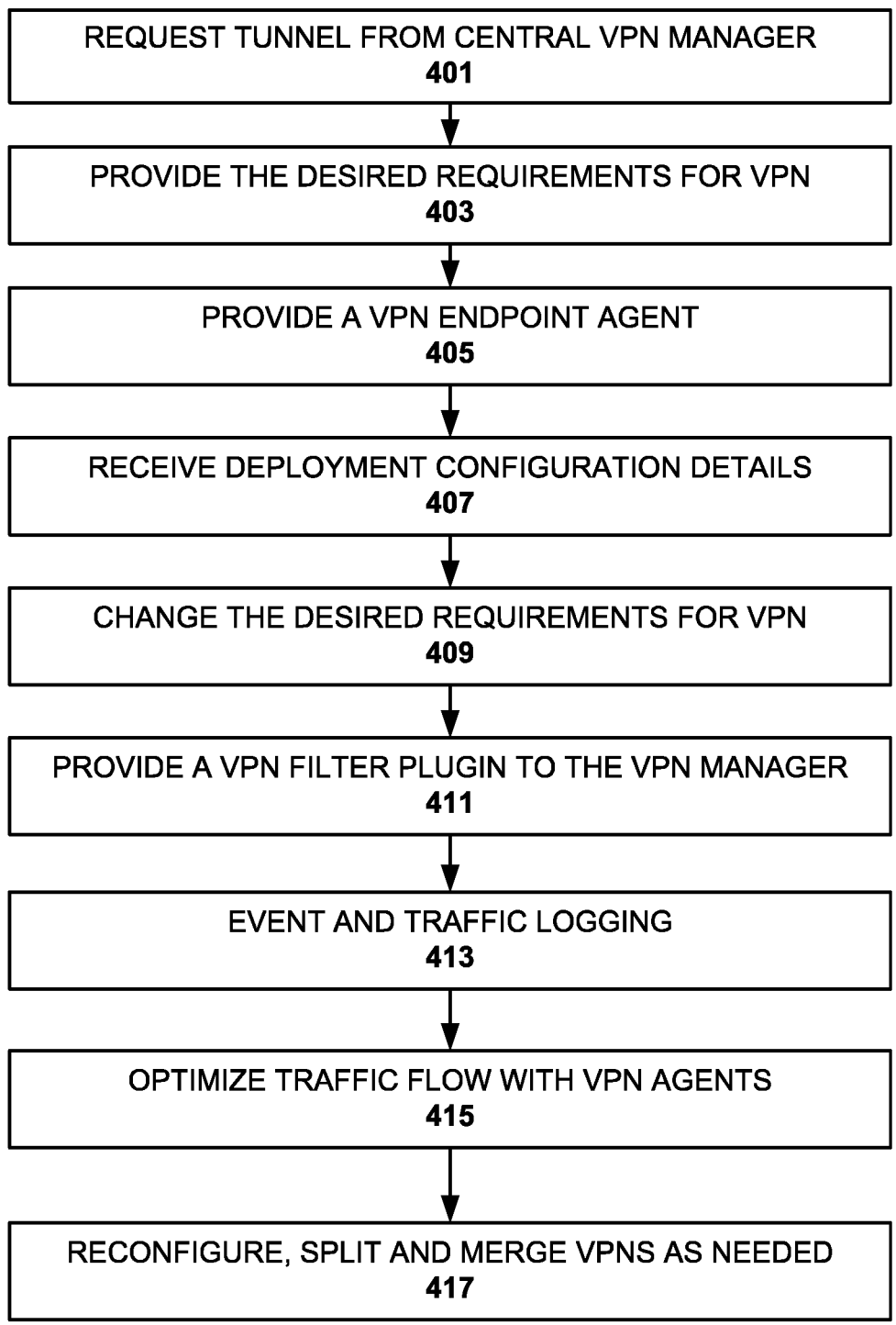
FIG. 4 is a high level flow diagram of a preferred embodiment of the invention.

At a high level, the general process for embodiments of the invention is illustrated in FIG. 4. As shown in step 401, the cloud applications, whether they are in the private cloud or public cloud, interact with a central VPN Manager to request tunnel creation. The central VPN Manager can be installed in either the public or private clouds and provided to the organization as a SaaS, a PaaS, or an IaaS capability. For the sake of simplicity, the flow which results from the requests of a single cloud application is shown. However, in a preferred embodiment, multiple cloud applications will be interacting with the VPN Manager simultaneously, and the process depicted in FIG. 4 may be in different stages for respective applications. In step 403, the application requesting the creation of a VPN tunnel provides the desired requirements for the VPN tunnel such as protocol, port, bandwidth limit, and other characteristics, e.g., the security qualities and the throughput capabilities, Next, in step 405, the VPN Manager provides a VPN endpoint agent, or simply "VPN agent", for installation on the requesting machine, or another machine in the same cloud. In preferred embodiments, the VPN agent is then installed in the target machine. The VPN endpoint agent may vary slightly to accommodate the requirements of the requesting machine, for example, a Linux based system versus an iOS based system. In some embodiments of the invention, the VPN agents may be specialized, configured in different types, and the type of VPN agent assigned to a particular VPN tunnel varies according the requested qualities and capabilities for the VPN tunnel. In other embodiments of the invention, a generic, full featured VPN agent is used which can provide a variety of VPN tunnel types. Depending on whether the request is the application's, or whether another application resident on the same machine has made a previous request, a VPN agent may already be present at the endpoint, or a nearby machine. Further, embodiments of the invention use existing agents, such as Chef agents, or an API to existing VPN controllers, rather than deploying a VPN agent. So step 405 is optional in many embodiments of the invention. In step 407, the VPN agent communicates with the VPN Manager to receive deployment configuration details as requested previously by the application and deploys the VPN tunnel according to those details.

As shown in step 409, the requesting applications can change the desired, requested security qualities and throughput capabilities throughout the application lifecycle for the VPN tunnel. The "tuning" of the VPN tunnel can change the security and other capabilities of the tunnel or, as discussed below, may involve merging or splitting the VPN tunnels to accommodate the changing requirements of the cloud applications. For example, in the case of changing the characteristics of the VPN tunnel, the VPN Manager may instruct the VPN agents to change a VPN tunnel from a big VPN pipe, two-way, fast security protocol tunnel used during deployment to a VPN tunnel which is a small one-way, very secure VPN pipe for production. The VPN network can be tuned to optimize security by only allowing the traffic and permissions needed by the authorized applications on a minimum number of VPN tunnels. Traffic performance can be increased by providing more VPN tunnels with a higher allowed bandwidth, at a possible cost to security. In one preferred embodiment, applications will communicate to the VPN Manager and the VPN Manager in turn will communicate to the VPN agents on the two endpoints of the VPN tunnel. This step, that is, dynamically changing the throughput and security qualities of a VPN tunnel, can be repeated throughout the application lifecycle.

As shown in step 411, the application can provide a VPN filter plugin to the VPN Manager. The VPN filter will be used to filter traffic passing over the VPN tunnel. VPN filters provide the ability to permit or deny traffic after it exits a VPN tunnel and traffic before it enters a VPN tunnel generally by listing the ACL fields for what IP/Port(s) should be permitted or denied. This step can be done as part of the request step 403, or later as part of the changing security qualities, e.g., as part of the change request in step 409. A VPN filter originally requested in step 403, could be superseded or supplemented by a later requested VPN filter. This step, requesting a new VPN filter, can be repeated throughout the application lifecycle. The VPN filter on a particular VPN tunnel can be modified in response to requests from other applications which share the communication bandwidth of the VPN tunnel, when the VPN tunnel is merged with other VPN tunnels or split into multiple VPN tunnels.

By event and traffic logging, the VPN Manager provides visibility into the VPN configuration, shown as step 413. In most preferred embodiments of the invention, event logging is provided. In some embodiments, traffic logging is provided as well. In one preferred embodiment, the event and traffic logging are VPN Manager related audit events. In other embodiments of the invention, the events related to applications connecting to other applications can be logged via the VPN agent. For example, the bandwidth used by the applications, including bandwidth history, may be logged by the VPN agents. In yet other embodiments, application communication traffic may be logged by the agents. Security related events will be consumed by Security Operations Center (SOC) for monitoring for security breaches. Event and traffic logging are described in greater detail below in connection with FIG. 8.

In preferred embodiments of the invention, the VPN Manager will route and reroute traffic across existing VPN agents and deploy new VPN agents to optimize traffic flow as needed, step 415. In response to detected drops in traffic, for example, using available traffic logs which are stored and monitored, the VPN Manager can instruct the VPN agents to merge VPN tunnels, if the security requirements for the traffic on the two VPN tunnels are compatible. The detecting could be performed at the VPN agent which monitors application traffic. Alternatively, merging VPN tunnels could be in response to a well-behaved application, sending a message to the VPN Manager that it has transitioned from a deployment phase to a production phase, and thus, requires less bandwidth. The VPN Manager determines that in view of the predicted reduction in demand, there is an opportunity to merge VPN tunnels. Alternatively, new requests from new or existing applications may cause new VPN agents to be created to handle a new anticipated load or requirement. The security requirements of the applications may change with the application lifecycle which may create the need for new VPN agents. This step may entail reassigning different VPN agents to different VPN tunnels, killing unneeded VPN agents and creating and providing new VPN agents to handle the merged VPN tunnel, or to handle a new VPN tunnel, if new traffic is expected.

Also as depicted as step 417, the VPN tunnels may need to be reconfigured because requests made by the applications during the lifecycle of the applications, monitored traffic changes, or due to changes in the machines on which the applications reside. As the application topology changes and machines get moved, the VPN Manager will instruct the VPN agents to reconfigure, merge and split VPNs as needed. According to the invention, "splitting" a VPN tunnel involves rerouting traffic from existing applications or machines which were previously handled by a single VPN tunnel to two VPN tunnels. In contrast, adding or creating a new VPN tunnel meets a new application request from an application which has not been previously served by the VPN Manager, but involves only traffic from a new source. The split of the VPN tunnel can contain traffic from new sources, but to be considered a split, some of the traffic on each of the VPN tunnels must come from existing sources. To a degree, the reconfiguration of the VPN tunnels and the preceding step of reconfiguring the VPN agents are similar steps as the VPN agents may need to be reconfigured and reassigned concurrently with the VPN tunnels, however, in the drawing, reconfiguring VPN agents and reconfiguring VPN tunnels are shown as separate steps for sake of clarity.

In a preferred embodiment of the invention, the capabilities of the VPN Manager, in concert with the VPN agents at the endpoints include the ability to create new VPN tunnels between different clouds within the hybrid cloud environment. The VPN Manager has the ability to configure tunnel policies, such as bandwidth thresholds (minimum and maximum) and security policies. The VPN Manager has the ability to federate with other VPN Managers which manage other cloud environments. The VPN Manager can optimize VPN tunnel infrastructure by merging or splitting VPN tunnels dynamically in response to new requests, changes in the application lifecycle, changes in traffic or network reconfiguration or to dynamically configure VPN tunnel specifications for existing VPN tunnels. The VPN tunnel policies are used by the VPN Manager to decide whether a proposed optimization is allowed, and whether a new request for VPN service can be accommodated by the existing VPN tunnel infrastructure or will require VPN tunnels to be merged, added, split or reconfigured.

Creating and maintaining a VPN tunnel is well known in the prior art. The VPN tunnel can be created according to the requirements specified by the administrator or requesting application. A VPN tunnel can be created by a software application or by a dedicated hardware device. The problem which the invention addresses is that once created, the prior art VPN tunnels are static and do not adapt to changes in the cloud environment such as application lifecycle changes and network topology changes. Because of their static natures, the prior art VPN tunnels present more of a security exposure than the those of the present invention. The present invention tunes the infrastructure of VPN tunnels to allow only the necessary traffic between cloud environments within the overall hybrid cloud environment.

Figure 5:
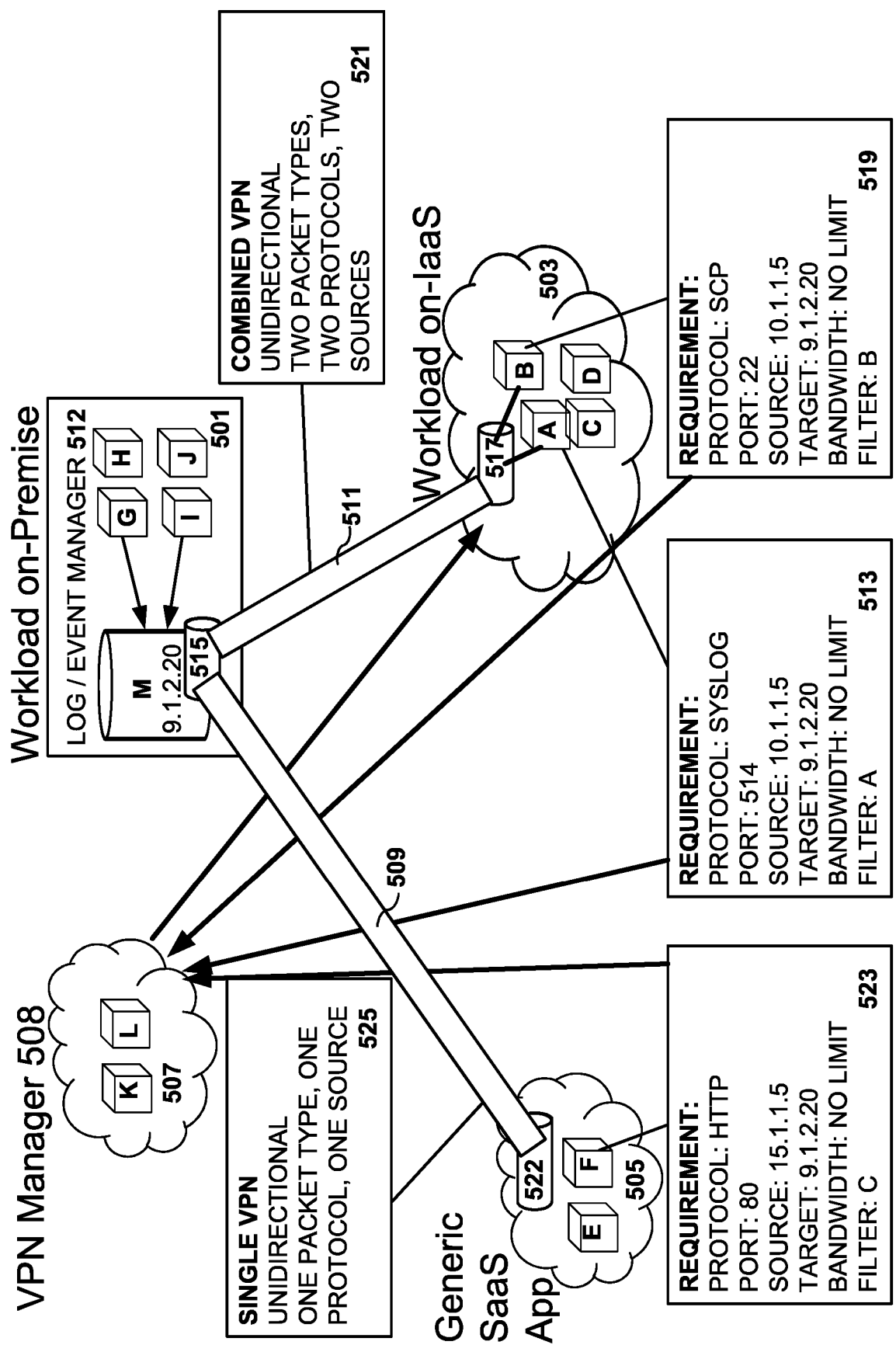
FIG. 5 illustrates a hybrid cloud environment in which an embodiment of the invention can be implemented.

More detailed descriptions of selected illustrative embodiments are provided below. As shown in FIG. 5, one preferred embodiment of the invention is used in a hybrid cloud environment that integrates on-premise infrastructure 501 hosting a private cloud, cloud workload on an IaaS infrastructure 503, and an application in a SaaS environment 505. The figure also depicts a VPN Manager 508 operating in a generic cloud environment 507. The generic cloud environment 507 in which the VPN Manager 508 is resident can be either a private cloud or a public cloud. Machines A-D are shown resident in IaaS infrastructure 501, machines E and F are shown in the SaaS environment 505, machines G-J are shown in the private cloud 501 and machines K and L are shown in the generic cloud environment 507. Log and Event Manager 512 is shown resident on machine M. VPN Manager 508 is resident on either machine K or machine L.

As shown in FIG. 5, VPN tunnels 509 and 511 are configured according to an illustrative embodiment of the invention. In this embodiment of the invention, an administrator is configuring the VPN tunnels using a user interface. In other embodiments of the invention, VPN Manager aware applications make requests directly to the VPN Manager. The administrator has Machine A contact the VPN Manager 508 and request a VPN tunnel connection 511 to Machine M so that log and event information can be reported to the log and event manager 512. As part of this request, Machine A provides the desired requirements 513 for the VPN tunnel:

PROTOCOL: SYSLOG
PORT: 541
SOURCE: 10.1.1.5
TARGET: 9.1.2.20
BANDWIDTH: NO LIMIT
FILTER: A (/^app1[a-z]{0,10}$/)
SECURITY POLICY A Those skilled in the art would appreciate that other parameters can be given as VPN tunnel requirements and that these are merely illustrative.

The inclusion of a security policy is optional. A security policy would most likely be included by a VPN Manager aware application. In lieu of a provided security policy, the VPN Manager will construct a security policy from the requirements provided by the requesting machine or application. Further, there may be a default security policy for communication between the respective clouds within the hybrid cloud environment. In the event of a conflict between a default security policy and provided or constructed security policy, the VPN Manager may issue an alert to the administrator via a user interface or have rules for resolving such conflicts, e.g., a provided security policy has precedence over a default security policy. Although both security requirements and security policies can be used in embodiments of the invention, in preferred embodiments of the invention, these terms have the following meanings. A "security requirement" is a security type parameter that the requesting machine requires to be present in a VPN tunnel. Examples of security requirements include a VPN protocol and encryption security protocol to be used. A "security policy" would indicate how the security requirements are to be used in a VPN tunnel. It could be a mandate that the VPN only use the security requirements specified by the requestor. As another example, if a requestor specified security requirement, a limited subset of compatible protocols which if requested by another requestor or used by another VPN tunnel which would form a basis for a candidate for joining the existing VPN tunnel or merger of the VPN tunnels. Alternatively, a security policy could be permissive allowing any security requirements specified by requestors from the same cloud to be included in the VPN tunnel, but no other security protocols if not requested by authorized machines. As another example, a security policy could state that certain security requirements were not compatible in the same VPN tunnel. Thus, a "security policy" can be used to evaluate whether the "security requirements" of a plurality of applications or a plurality of VPN tunnels are compatible.

In one preferred embodiment, if the VPN Manager 508 has no prior contact with Machine M, the VPN Manager 508 awaits a connection from Machine M. In this embodiment, the administrator registers Machine M with the VPN Manager. In response to the request or registration, the VPN Manager 508 installs VPN agents 515, 517 respectively on Machine M and Machine A. Next, acting through the installed VPN agents 515, 517, the VPN Manager 508 configures the VPN 511 between Machine A and Machine M with the specified parameters in the Machine A request 513 (syslog, port, unidirectional, bandwidth, etc.). That is, the VPN Manager 508 issues instructions and configuration requirements to the VPN agents which the VPN agents (or other existing entities) carry out. As is known to those skilled in the art, the VPN tunnel would use a selected VPN security technology, such as the Internet Protocol security (IPsec), Secure Socket Layer/Transport Layer Security (SSL/TLS), or multiprotocol label switching (MPLS) to secure the tunnel. Other VPN security protocols include Datagram Transport Layer Security (DTLS), MICROSOFT™ Point-to-Point Encryption (MPPE), and Secure Shell (SSH) protocols. The VPN security requirements in the Machine A could include the selection of the VPN security protocol as well as the capabilities to encrypt data according to different encryption standards such as support data encryption standards (DES)/Triple DES (3DES) and Advanced Encryption Standard (AES) with different key sizes or multicast or group encryption standards. The VPN security requirements can include the ability to compress data according to a standard such as Lempel-Ziv-Stac (LZS) prior to encryption.

The administrator next has Machine B contact VPN Manager and request a VPN connection to Machine M. As part of this request, Machine B provides the desired requirements 519 for the VPN:

PROTOCOL: SCP
PORT: 22
SOURCE: 10.1.1.5
TARGET: 9.1.2.20
BANDWIDTH: NO LIMIT
FILTER: B (/^app2[a-z]{0,30}$/)
SECURITY POLICY B In response to the request, the VPN Manager 508 installs a VPN agent on Machine B. The VPN Manager identifies the pre-existing nearby VPN tunnel 511 originating from Machine A. After establishing that Machine A's and Machine B's security policies are compatible, the VPN Manager 508 configures Machine B via the VPN agent on Machine B to send specified traffic to Machine A. Specified traffic is that traffic allowed by the security policies. For example, certain security policies may allow only http traffic and not ftp traffic on the VPN tunnel. Then, the VPN Manager 508 reconfigures the A to M VPN tunnel 511 to include the VPN filters from the Machine B requirements 519. In this way, an existing VPN tunnel 511 from one machine can be reconfigured to pass traffic from another machine in the same cloud 503. The resulting VPN tunnel 511 has the following properties 521: Unidirectional, two packet types (one from each of the applications), two protocols (syslog and SCP), coming from two sources. The aggregate VPN filter for VPN tunnel 511 is more permissive in that it now allows traffic from two sources and two packet types, however, in the preferred embodiment, the VPN filter still checks that the correct packet type is coming from the correct machine.

In this illustrative embodiment, the VPN Manager 508 can manage VPN tunnels between more than two clouds in which the organization has machines. Continuing the example, the administrator requests that a VPN tunnel from Machine F from Generic SaaS Application in SaaS environment 505 to the Log and Event Manager 512 in private cloud 501 be created. Either the administrator or the Generic SaaS Application owner makes a request to the VPN Manager using the administrator supplied credentials to create a VPN tunnel. The request contains the desired requirements 523 for the VPN:

PROTOCOL: SCP
PORT: 80
SOURCE: 15.1.1.5
TARGET: 9.1.2.20
BANDWIDTH: NO LIMIT
FILTER: C(/^app3[a-z]{0,50}$/)

In response to the request, the VPN Manager 508 installs a VPN agent 522 on Machine F. Through the VPN agent 522, the VPN Manager 508 configures a VPN tunnel between Machine F and Machine M with the specified filters from the initial request 523.

In this illustrative embodiment, Machines A and B provide log and event data to the Log and Event Manager on Machine M through VPN tunnel 511, and Machine F provides such data through VPN tunnel 509. As shown in the figure, co-located Machines G and I also provide log and event data to the Log and Event Manager. As Machines G and I can communicate directly through the private network in private cloud 501 with Machine M, there is no need to involve the VPN Manager 508.

The steps described above provide an illustrative example of the initial configuration of the VPN tunnels. As will be discussed below, as the needs of the applications change during their lifecycle, a well behaved application can issue further requests to change the parameters needed for the tunnel. For example, during deployment or other periods of high usage, the application will require a high bandwidth through the tunnel. At other times, for example, during routine monitoring, the application will require a lower bandwidth. The application can issue further requests changing the requested bandwidth. In alternative embodiments, the VPN agent managing the VPN tunnel can monitor traffic coming from a set of applications. If the monitored traffic is much lower than requested, the VPN agent or VPN Manager can recognize an opportunity to merge the tunnel with another suitable or reconfigure the tunnel for a lower bandwidth. At end of life, e.g., when the application is uninstalled, as part of the uninstallation process a well behaved application will inform the VPN Manager that a VPN tunnel is no longer required. The security requirements of an application can also change during its lifecycle. In yet other embodiments of the invention, the event and logging information is presented to an administrator who can issue requests for changing the VPN agent and VPN tunnel configuration based on perceived application lifecycle changes from the event and logging information.

Figure 6:
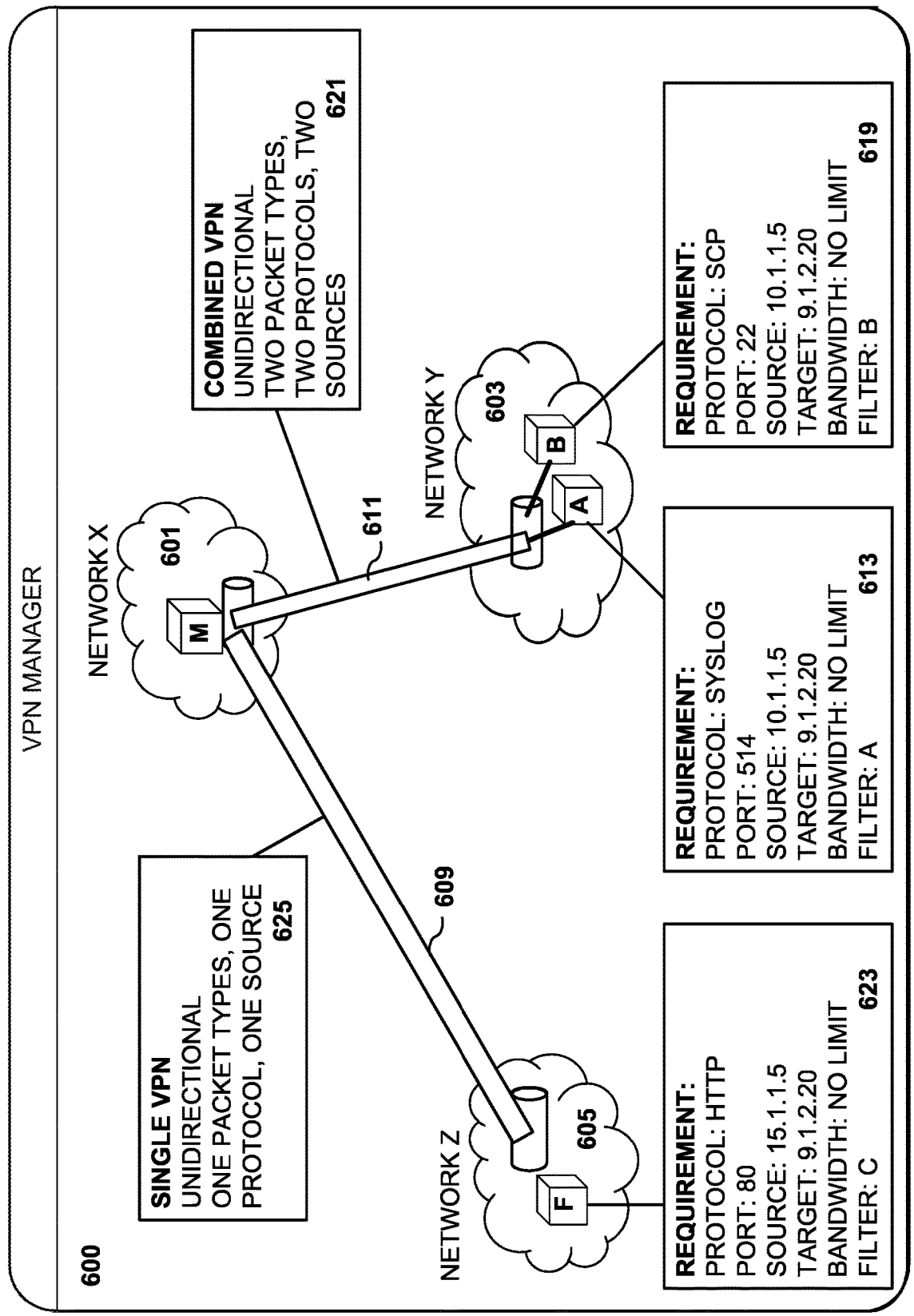
FIG. 6 illustrates a graphical user interface in which the VPN tunnels and VPN properties can be displayed to an administrator user.

FIG. 6 depicts one embodiment of an administrator view in a graphical user interface 600 in a sample dashboard provided by the VPN Manager. One skilled in the art will appreciate that other alternative user interfaces can be provided according to the teachings of the invention. In this view, a current status view of the VPN tunnels is shown just after the initial configuration described in association with FIG. 5. In this embodiment of the current status view, only the existing VPN tunnels, the clouds connected by the VPN tunnels and machines using the VPN tunnels are depicted and not the other components in the hybrid cloud environment. Other embodiments of the current status view would show other components. Machine M in private network 601 is shown respectively coupled to IaaS infrastructure 603 and SaaS environment 605 by VPN tunnel 611 and VPN tunnel 609. The requested configuration parameters from Machine A are shown in panel 613, while the requested configuration parameters from Machine B are shown in panel 619. The resulting VPN parameters of VPN tunnel 611 are shown in panel 621. Similarly, the requested configuration parameters from machine F are shown in panel 623 while the resulting VPN parameters for VPN tunnel 609 are shown in panel 625. In one preferred embodiment, each of the panels 613, 619, 621, 623 and 625 are editable by the system administrator. By editing one of the requested configuration parameter panels 613, 619 or 623, a new request is made to the VPN Manager for the VPN characteristics desired by one of the machines or applications running on the machines. Once that request is executed, an update to the VPN characteristics would be shown in the appropriate VPN parameters panel 621 or 625.

If insufficient space was available in the panel, a scroll control would be presented, allowing the administrator to scroll through all of the available parameters. Non-editable parameters could be presented in a greyed out manner. Other views of the network are envisioned in preferred embodiments of the invention. For example, all of the machines in the networks could be presented so that new VPN connections could be created. A point and drag mechanism could be used to define the new tunnel. In response to a point and drag operation by the administrator, default editable parameters could be populated in the requested configuration panel which the administrator could edit or submit. In another alternative embodiment, an application view can be presented showing the applications operating in each of the environments rather than the machines.

Alerts can be presented. For example, in one preferred embodiment, VPN tunnel 611 or VPN parameter panel 621 is presented in a highlighted manner, indicating an action for the administrator's attention. For example, highlighting two tunnels in the interface may indicate an opportunity for merging the two tunnels to provide more efficient service. Highlighting a single tunnel may indicate that the throughput is exceeding the capacity of the tunnel, or that a new request for service cannot be accommodated with the existing tunnel because of a conflict between a new set of requirements and the already existing VPN parameters for the tunnel created by prior requests. If the highlighted tunnels were selected by the administrator, additional details, such as event logs and throughputs which were causes of the alerts can be presented in additional panels.

The VPN Manager would expose options to manually add, delete and reconfigure VPN agents and VPN tunnels. In one preferred embodiment, the user interface (UI) would be a UI+REST API interface. The Web based UI will use the REST API, or an external application could use the REST API directly.

Figure 7A:
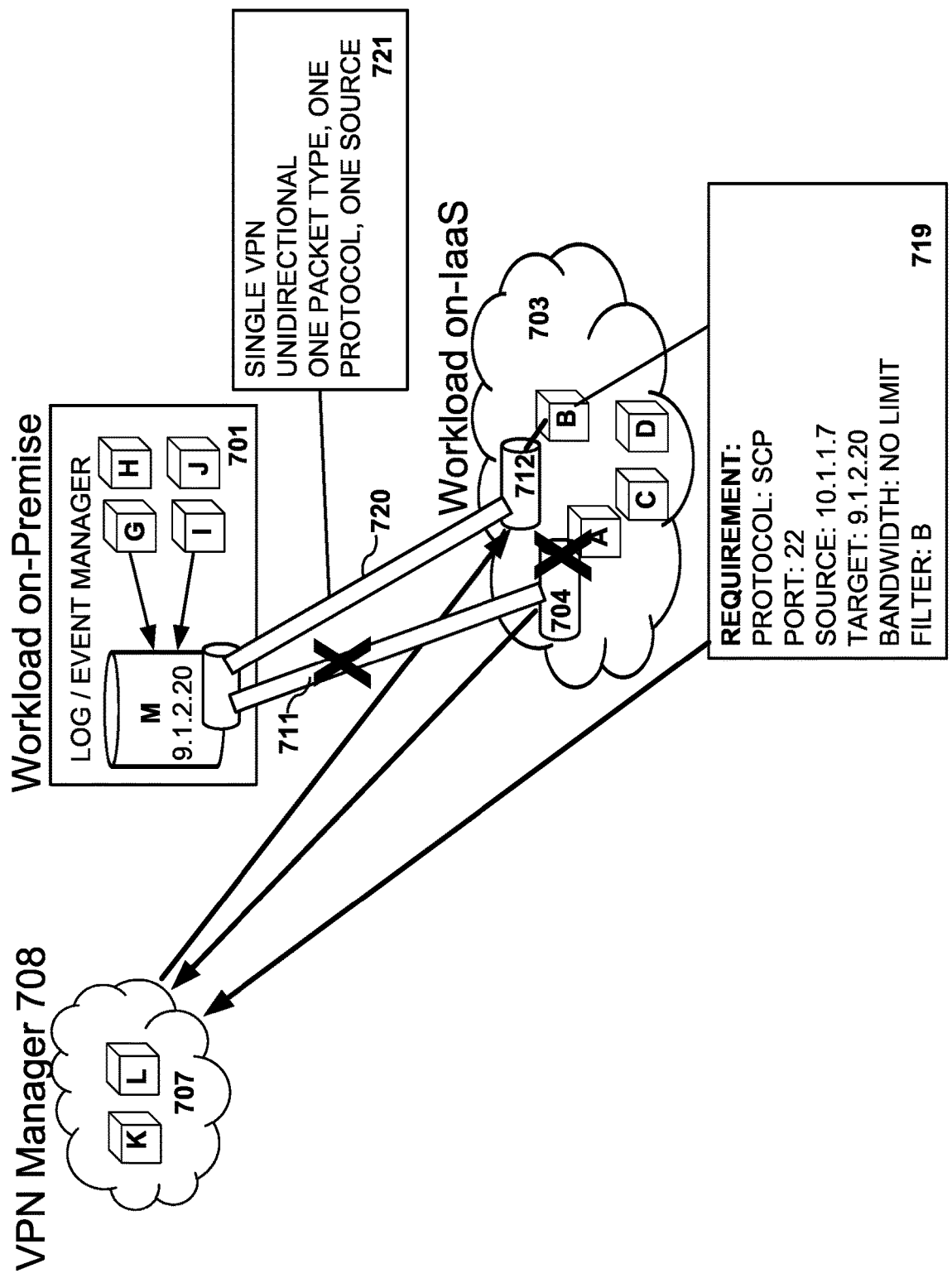
FIGS. 7A-7C respectively depict changing the properties, merging VPN tunnels and spiltting of a VPN tunnel in response to changes in the user application demands.

In FIG. 7A, an illustrative embodiment of reconfiguration of the VPN tunnels is shown. This example shows an example of a network topology change which causes the VPN Manager 708 to change the VPN tunnel infrastructure of the hybrid cloud. In the example, it is the removal of a machine from one of the clouds. Other network topology changes include the addition or removal of a cloud application, the addition of a "clone" machine having a same cloud application as another machine, e.g., for load balancing, moving a cloud application from one machine to another machine and moving a cloud application from one cloud to another cloud, e.g., from a private cloud to a public cloud. In preferred embodiments of the invention, this sort of network topology change will be sent to the VPN Manager 708 as an "event" and the VPN Manager 708 will either perform automatic reconfiguration of the VPN tunnel infrastructure or present an alert to the administrator as a situation which is a candidate for a VPN tunnel reconfiguration.

As denoted by the "X", the administrator removes Machine A from the IaaS infrastructure 703, which triggers a reconfiguration of Machine B traffic handled by Machine A. As the administrator begins removal of Machine A, the VPN agent 704 on Machine A contacts VPN Manager in the cloud 707. The VPN Manager analyzes the combined VPN connections in VPN tunnel 711, in this case, the VPN tunnel 711 which originates from Machine A also handles traffic from Machine B. The VPN Manager 708 instructs VPN agent 712 on Machine B to create a Machine B to Machine M VPN tunnel 720 using pre-existing requirements, i.e. the existing requirements from Machine B and any other machine in IaaS infrastructure 703 which had been using VPN tunnel 711. Since Machine A is being removed, none of its requirements are relevant. Only the Machine B requirements are used when setting up the VPN filter for the tunnel. In the diagram, the Machine B requirements when requesting VPN service are illustrated. Machine B had provided the desired requirements 719 for the VPN:

PROTOCOL: SCP
PORT: 22
SOURCE: 10.1.1.5
TARGET: 9.1.2.20
BANDWIDTH: NO LIMIT
FILTER: B(/^app2[a-z]{0,30}$/)
SECURITY POLICY B As shown, the VPN parameters 721 for the new VPN tunnel 720 are different from the parameters 521 for the combined VPN tunnel 511 shown in FIG. 5, or VPN tunnel 711 in this figure. VPN tunnel 711 is removed as denoted by the "X". By only accommodating requested parameters from recognized machines which have current VPN tunnel needs, security is increased.

FIG. 7A can also be used to discuss the removal of an application from machine A. In this case, once the new VPN tunnel 720 is created, the VPN Manager 708 optionally removes the A to M VPN tunnel 711. Also optionally, the VPN Manager 708 uninstalls VPN agent 704 on Machine A. These optional steps produce a well behaved system, and reduce the security risk of maintaining the VPN tunnel and VPN agent when there are no subscribing, authorized applications resident on Machine A. However, alternative embodiments could keep the VPN tunnel or VPN agent alive, to reduce the overhead of starting a new VPN agent in case a new application request was made to the VPN Manager.

In embodiments of the invention, there are sets of rules for merging and splitting the VPN tunnels. Security based rules are concerned with whether the security requirements or policies of each of the applications being serviced by or potentially being serviced by a VPN tunnel are compatible with the other applications' security requirements or policies. Merging VPN tunnels would be conditioned on the security requirements of the applications being serviced by candidate VPN tunnels being compatible. In embodiments of the invention, the compatibility of the security requirements are interpreted based on the security policies of the applications or the security policy of the VPN Manager for cloud to cloud communication. For example, if one VPN tunnel allows only http traffic and another VPN tunnel allows only ftp traffic due to the application security policies, then the two tunnels cannot be merged. However, if both tunnels allow http traffic or all traffic, then they can be merged. As another example, the two applications on two different VPN tunnels may require two different security or encryption protocols, and the security policy of the VPN Manager in effect for communication between the two clouds requires that a single encryption protocol be used. Thus, an application security requirement or policy can prevent merger of VPN tunnels which might otherwise be merged for throughput efficiency.

In view of a new request from an application containing a new set of security requirements, an evaluation of the current VPN in view of a compatibility rule could cause the current VPN tunnel to be split. In a preferred embodiment, compatibility for a potential merge is determined by evaluating the security requirements and VPN filters on the two VPN tunnels for direct conflicts. If a conflict is found, in some embodiments, a user interface may display the candidate VPN tunnels to an administrator to display the conflicts and the changes needed to make the VPN tunnels compatible. In this way, an administrator can decide if modifying the VPN filter, adding additional types of traffic or security or encryption protocols to the current VPN would be acceptable from a security standpoint. Another case when the VPN tunnel can be split in an embodiment is when the security requirements change of one of the applications which use a shared VPN tunnel. For example, if an application now wants to transmit ftp traffic in addition to the original http traffic and the current VPN tunnel does not allow ftp traffic, then the VPN tunnel could be split. As another example, if one of the applications wants a higher level of encryption than the current VPN tunnel, it may make sense to split the current VPN tunnel, rather than to incur higher overhead on all traffic. Other compatibility based rules, for parameters other than security based parameters, are used in other embodiments of the invention.

Another set of rules is based on bandwidth or throughput of a VPN tunnel. A bandwidth rule can be based on an upper or lower threshold on bandwidth, for example. Splitting VPN tunnels can be performed if the traffic of multiple applications is crossing the permissible tunnel limit (bandwidth). In this case, the VPN Manager will then split the tunnel. Merging VPN tunnels can be performed if one or more compatible VPN tunnels has a bandwidth below the minimum tunnel bandwidth limit.

Figure 7B:
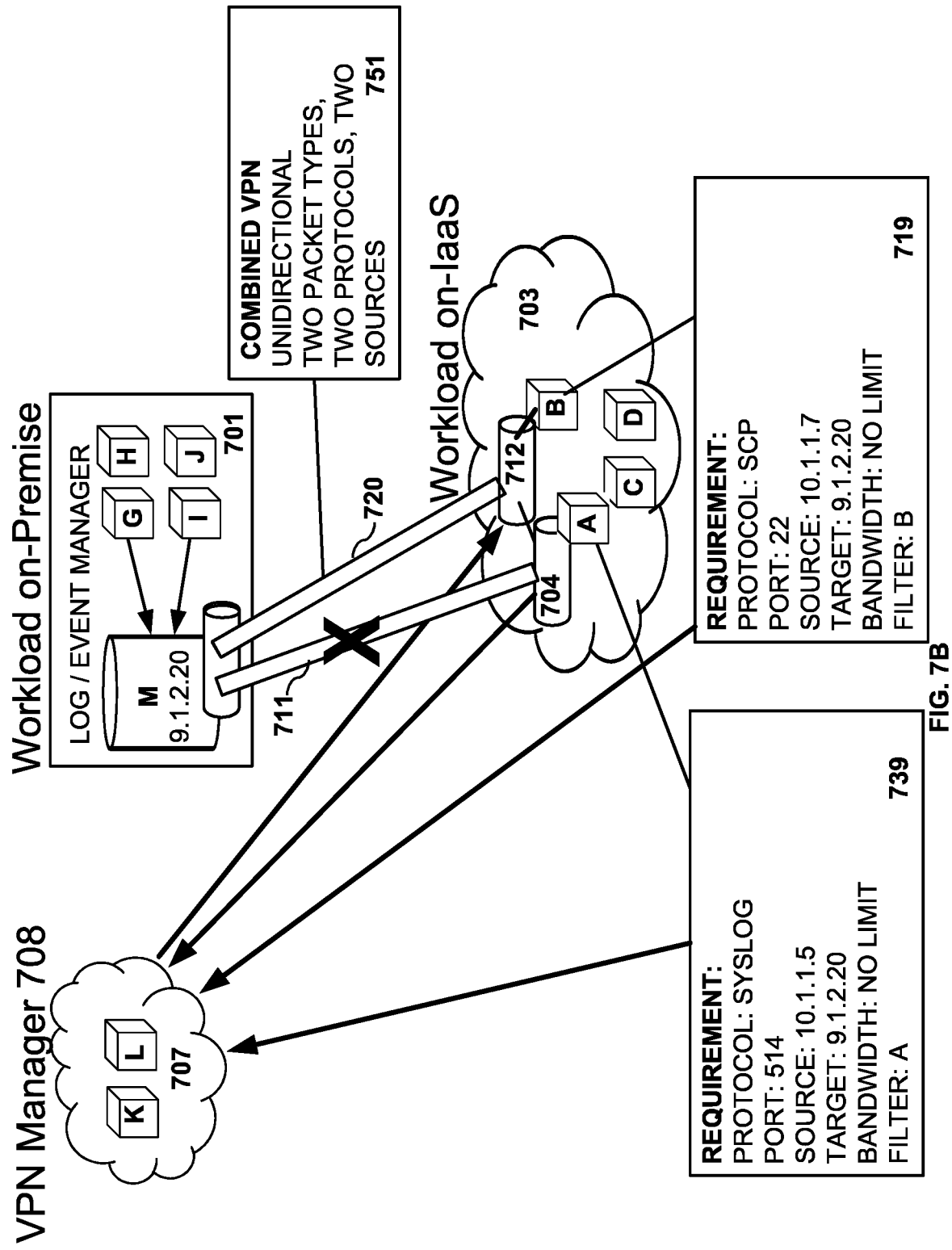

In FIG. 7B, an illustrative embodiment of reconfiguration and merging the VPN tunnels is shown. This example shows the case where the demands from the applications on machines A and B have changed because of reduced bandwidth requirements allowing merger of VPN tunnels 711 and 720. Another case which would allow a merger of the VPN tunnels is a change in security protocols for one of the applications so that the new set of security protocols is compatible according to security policies in effect. As shown, VPN tunnel 711 is being removed between the clouds 701 and 703 as the other VPN tunnel 720 can accommodate the aggregate demand. In preferred embodiments of the invention, the traffic (in addition to security requirements) on the two VPN tunnels must be compatible for merger. In preferred embodiments of the invention, the VPN Manager 708 receives information from the VPN agents 704 and 712 assigned to Machine A and Machine B. The VPN Manager reconfigures VPN agent 712 on Machine B to modify the Machine B to Machine M VPN tunnel 720 adding requirements, i.e. the existing requirements from Machine A which had been using VPN tunnel 711. In the diagram, the Machine A requirements 739 and Machine B requirements 719 are illustrated. Machine A provides the desired requirements 739 for the VPN tunnel:

PROTOCOL: SYSLOG
PORT: 541
SOURCE: 10.1.1.5
TARGET: 9.1.2.20

BANDWIDTH: NO LIMIT
FILTER: A (/^app1[a-z]{0,10}$/)
Machine B had provided the desired requirements 719 for the VPN:
PROTOCOL: SCP
PORT: 22
SOURCE: 10.1.1.5
TARGET: 9.1.2.20
BANDWIDTH: NO LIMIT
FILTER: B(/^app2[a-z]{0,30}$/)

As shown, the VPN parameters 751 for the modified VPN tunnel 720 are different from the parameters from the individual VPN tunnels 711 and 720 when they were supporting a single application. By only accommodating requested parameters from recognized machines, security is increased. In this figure, the VPN agent 704 on Machine A forwards the traffic from Machine A to the VPN agent 712 on Machine B so that VPN tunnel 720 can handle the combined traffic.

Figure 7C:
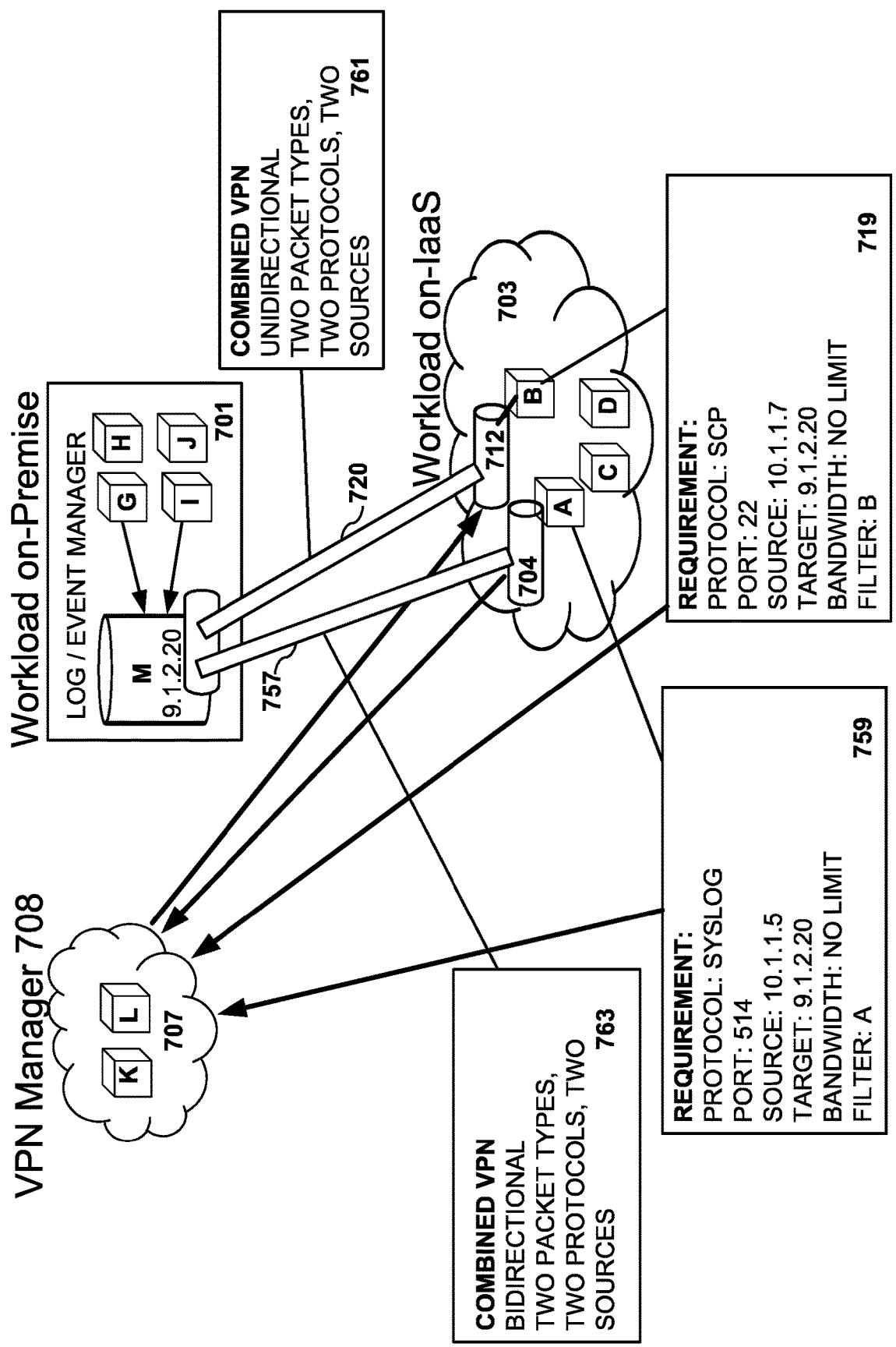

In FIG. 7C, an illustrative embodiment of splitting a VPN tunnel 720 is shown. In this example, VPN tunnel 720 is no longer adequate to handle the communications from both Machine A and Machine B. The splitting of VPN tunnel can be the result of an administrator action or a request by a VPN Manager aware application indicating that its requirements have changed or will change soon. The VPN Manager analyzes the combined VPN connections in VPN tunnel 720 which originates from Machine B also handles traffic from Machine A and can display an alert to an administrator via a user interface. In this example, a new set of requirements 759 is received from the application running on Machine A indicating an expected increase in demand due to an update which will require a bidirectional VPN tunnel as well as a new security encryption protocol. In recognition that these new requirements 759 cannot be fulfilled with VPN tunnel 720, or at least that modification of VPN tunnel 720 in response to the new requirements is not optimal, either from a security or throughput standpoint, the VPN Manager 708 reconfigures VPN agent 704 on Machine A to create a new Machine A to Machine M VPN tunnel 763 using the new requirements. Thus, the old VPN tunnel 720 is "split" as traffic from the sources on Machine A and Machine B will be serviced by two VPN tunnels in the new VPN tunnel infrastructure.

Machine A provides the desired requirements 759 for the VPN tunnel 763:
PROTOCOL: SYSLOG
ENCRYPTION PROTOCOL: ECC
PORT: 541
SOURCE: 10.1.1.5
TARGET: 9.1.2.20
BANDWIDTH: NO LIMIT BIDIRECTIONAL
FILTER: A (/^app1[a-z]{0,10}$/)

The VPN agent 712 on Machine B reconfigures VPN tunnel 720 so that it only uses the Machine B requirements:
PROTOCOL: SCP
PORT: 22
SOURCE: 10.1.1.5
TARGET: 9.1.2.20
BANDWIDTH: NO LIMIT
FILTER: B(/^app2[a-z]{0,30}$/)

Again, by only accommodating requested parameters from recognized machines, security is increased, so the new VPN parameters 761 for the modified VPN tunnel 720 are different from the parameters 751 for the combined VPN tunnel 720 shown in FIG. 7B. Similarly, the VPN parameters 763 for new created VPN tunnel 757 only reflect the requirements 759 for Machine A.

Figure 8:
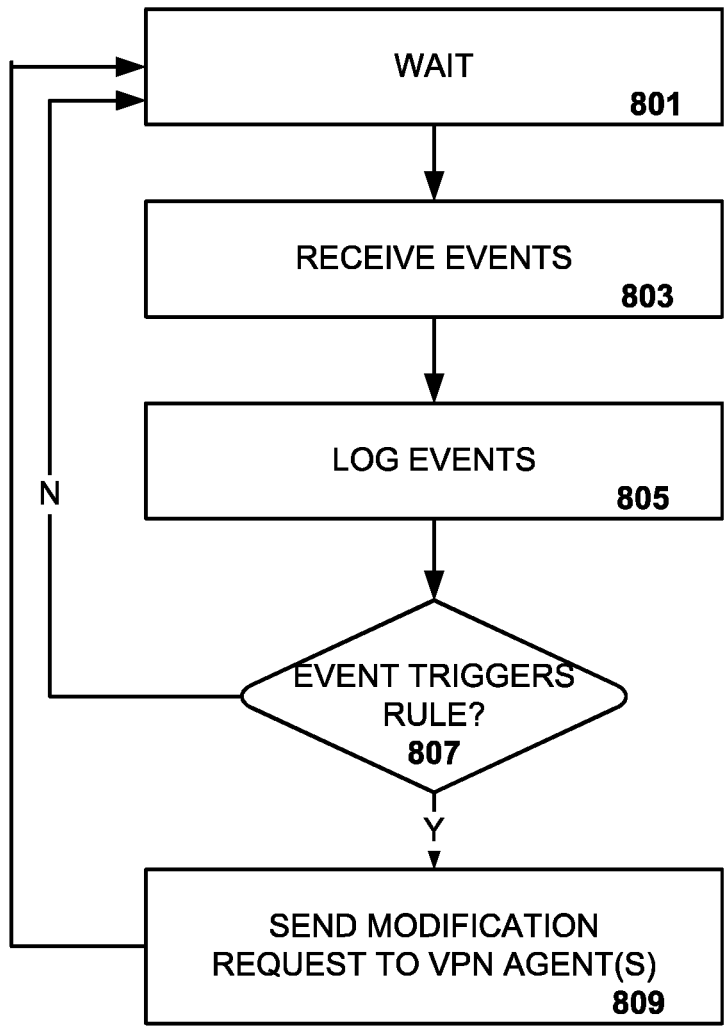
FIG. 8 is a flow diagram of event and log management in one embodiment of the invention.

FIG. 8 is a flow diagram of the event reporting and logging operations of the VPN Manager. The event and traffic logging allows the VPN Manager to understand which applications are communicating with which other applications. It also allows the VPN Manager to understand which clouds are being interconnected, what data is being communicated. Further, event reporting and logging operations will allow for the detection of policy violations or security breaches by the Security Operations Center (SOC).

In step 801, the VPN Manager waits for events to be reported by the VPN agents. As events are received, step 803, the events are logged, step 805. The VPN Manager determines whether the received event(s) trigger a rule in step 807. To trigger a rule, the most recently received event may need to be correlated with events which have already been logged. As has been mentioned previously, one example of a rule is a traffic threshold rule. If the traffic on a VPN is exceeding or projected to exceed a threshold, the VPN Manager will issue instructions to the VPN agents to split a single VPN tunnel into two tunnels. Another traffic threshold rule is a minimum traffic rule. If adjacent VPN tunnels have traffic below a threshold, the VPN Manager may issue instructions to the VPN agents to merge VPN tunnels. Another example of a rule is a security related rule. If there have been security events related to a VPN tunnel, the VPN Manager may issue instructions to the VPN agents to change the security parameters for the tunnel. For example, detected intrusion events for one of the machines being serviced by a VPN tunnel has experienced problematic events which bear further scrutiny. Thus, the VPN Manager may issue instructions to the VPN agent(s) for that tunnel to monitor events from the machine more closely or split the VPN tunnel so that events from the affected machine can be monitored, i.e. all events from the new tunnel are monitored, while allowing events from other nonaffected machines to have lower intrusion detection overhead.

If the event is a modification request made by a VPN Manager aware application, the default rule may be to comply with the request. In this case, the VPN Manager will issue instructions to the VPN agent(s) consistent with the modification request. Another rule would be to evaluate whether the modification request is consistent with the security policies in place for the VPN tunnel, and if not, to alert an administrator for further action.

If a rule has been triggered by the event(s), in step 809, the VPN Manager will issue instructions to the VPN agents to tune the VPN tunnel(s) appropriately. As explained above, tuning the VPN tunnel(s) includes modifying the parameters on a VPN tunnel, merging VPN tunnels or splitting a VPN tunnel into two or more VPN tunnels. In one preferred embodiment, the rule will trigger an alert in a user interface to allow an administrator to confirm and/or modify the instructions to the VPN agents. The process returns to wait for new events in step 801.

Figure 9:
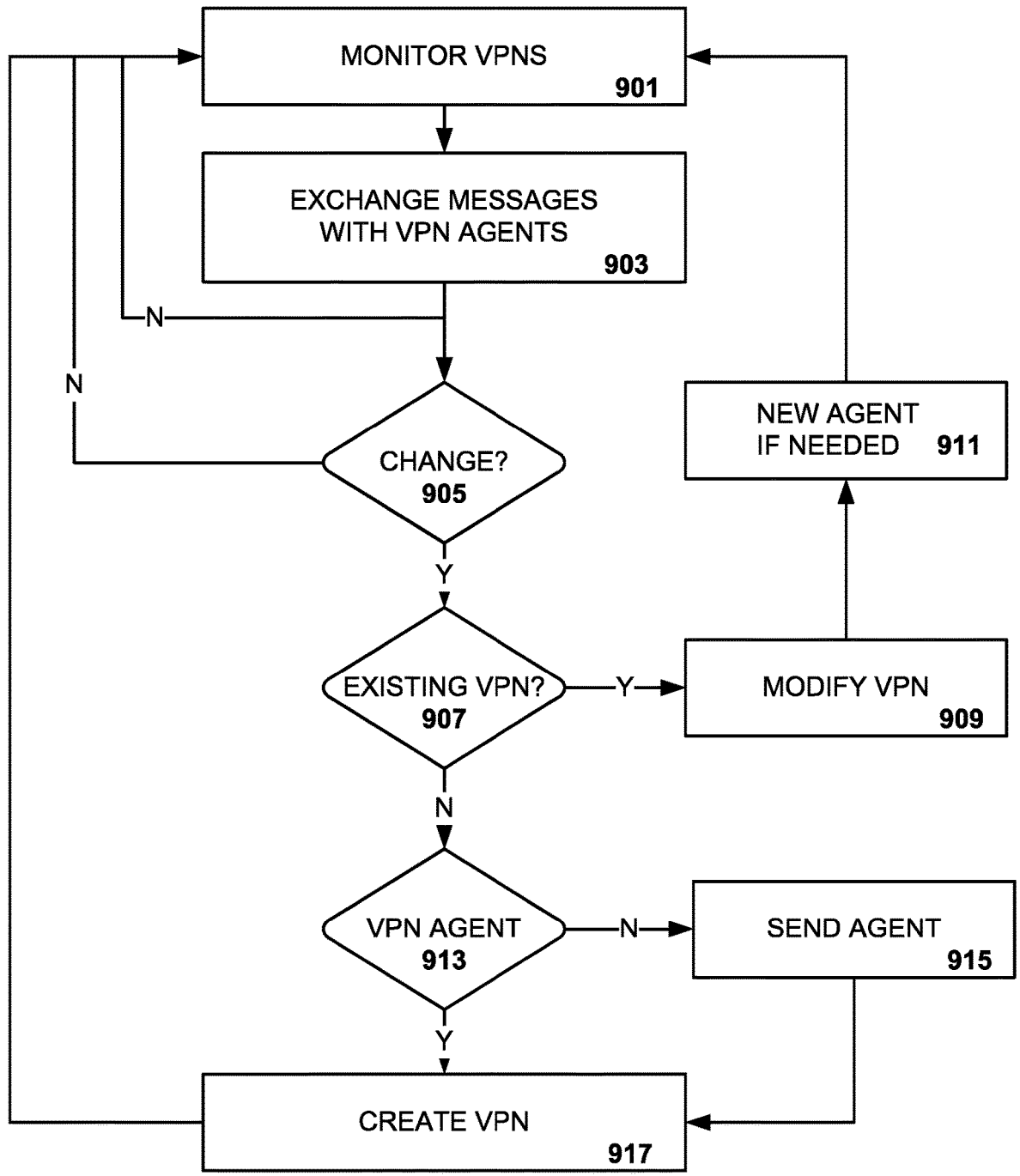
FIG. 9 is a flow diagram of the creation and modification of VPN tunnels according to one embodiment on the invention.

FIG. 9 illustrates the process of optimizing traffic flow, merging and splitting VPNs according to one embodiment of the invention. The process begins in step 901, with the VPN Manager monitoring the existing VPN tunnels. This step includes monitoring for throughput and the events described above in connection with FIG. 8. In one preferred embodiment, the VPN agents established at each tunnel endpoint and subscribing machine and/or application report the relevant information to the VPN Manager, step 903. Any instructions which the VPN Manager needs to communicate to the VPN agent are also transmitted in this step. Examples of instructions which the VPN Manager will communicate to the VPN agent include which VPN tunnel to use for traffic from a given application or machine, which end point (e.g., application) to connect the VPN tunnel to, what filter settings to have on, VPN agent and agent configuration related data, and so forth.

Based on the information received, in step 905, a decision is made whether a change to the existing VPN infrastructure is indicated. An affirmative decision can be based on many factors. First, as described above, there could be a new administrator or application based request for changes to the VPN tunnel settings. The new request could pertain to a new connection for a new application or a new machine or to a change to an existing VPN tunnel between already subscribing machines. Second, the change could be indicated by the throughput measurements by the VPN agents. VPN tunnels could be initially created by applications in a deployment phase of the application lifecycle, where high bandwidth requirements exist. Thus, to provide the needed bandwidth, separate VPN tunnels are created. Later, in the production phase of the application lifecycle, the bandwidth requirements of the applications are lower, so provided that the security requirements are compatible between applications, VPN tunnels can be merged. Third, at the end of the application lifecycle, when the application is removed, the VPN tunnel and VPN agent for that application can be removed or modified to support only those applications still resident at the end point. The VPN agents report that the VPN tunnels are being underutilized, and therefore, are candidates for merger with other VPN tunnels. The VPN Manager, having a map of all of the existing VPN tunnels under its control, issues the needed commands for merger, e.g., an existing set of requirements for the VPN tunnel to be closed is sent to the first VPN agent controlling the first VPN tunnel to remain open, a command to alter the VPN characteristics of the first VPN tunnel to those new requirements, a command to forward communications from the second VPN agent currently controlling the second VPN tunnel to be closed instead to the first VPN agent and so forth.

The change could be an indication that a VPN tunnel needs to be split because of new bandwidth or security requirements. Previously merged VPN tunnels are often prime candidates for splitting into multiple tunnels. During the application lifetimes, there made be periods in which the bandwidth or security requirements change, for example, during an update or in response to an indicated intrusion of one of the cloud applications, i.e. requiring special security handling. Another reason a VPN tunnel needs to be split is due to new request by additional machines or applications. Suppose that in the example above, described in reference to FIG. 5, that VPN tunnel 511 was adequate to service Machine A and Machine B, however, application or administrator requests were made for VPN service for Machines C and D, and a single VPN tunnel could not fulfill the bandwidth requirements for all four machines. One option might be to create a new VPN tunnel servicing Machines C and D. However, the VPN Manager might establish that the requirements for Machines A and C are more compatible than Machines A and B, and so it would be most efficient to have one VPN tunnel service Machines A and C and a second VPN tunnel service B and D. If no change is indicated, then the process returns to monitoring the VPN tunnels, step 901.

In step 907, a determination whether the change can be accomplished with the existing set of VPN tunnels. In general, it will be more efficient, and the cloud will be less porous to security attacks, the fewer VPN tunnels between the two clouds that are maintained. A comparison of the requested bandwidth, current bandwidth and available bandwidth of the current tunnel is made. A comparison of the existing and requested security parameters is made to determine the compatibility of the security parameters requested by the respective applications. If the existing VPN tunnels can be used, including merger of the existing VPN tunnels, the existing VPN agents are issued the desired requirements to make any needed changes to the VPN tunnels. If the VPN tunnels can be used, it is likely that there are VPN agents already installed in the requesting machines. However, if new VPN agents are needed, e.g., in an embodiment where specialized rather than generic VPN agents are used, the VPN Manager sends them to the machine endpoints in step 911. The process then continues monitoring the existing VPN infrastructure, step 901.

On the other hand, if the change requires a new VPN tunnel, the process then determines whether a VPN agent is already installed in step 913. If not, in step 915, the VPN Manager sends the new VPN agent to the endpoint which needs it. In step 917, the new VPN tunnel is created through the new and/or existing VPN agents. The new VPN tunnel may be considered a split of an existing tunnel. The process then returns to step 901 to monitor the VPN infrastructure for possible changes.

In the preferred embodiments of the invention, a central VPN Manager is controlled by a single system or cloud provider. For example, in cloud environments, it would be valuable for IaaS and PaaS providers to provide a VPN capability as enabled by the present invention into those environments.

A federation model can be used where one VPN Manager is provided by one cloud provider, and the cloud provider uses a model similar to federated identity (OAuth, OpenID, etc.) to create a trust model between client networks and other cloud networks. When an application belonging a one organization wants a VPN tunnel, it can use a federation type authentication with the organization VPN server to have trust established with the cloud provider VPN Manager.

Figure 10:
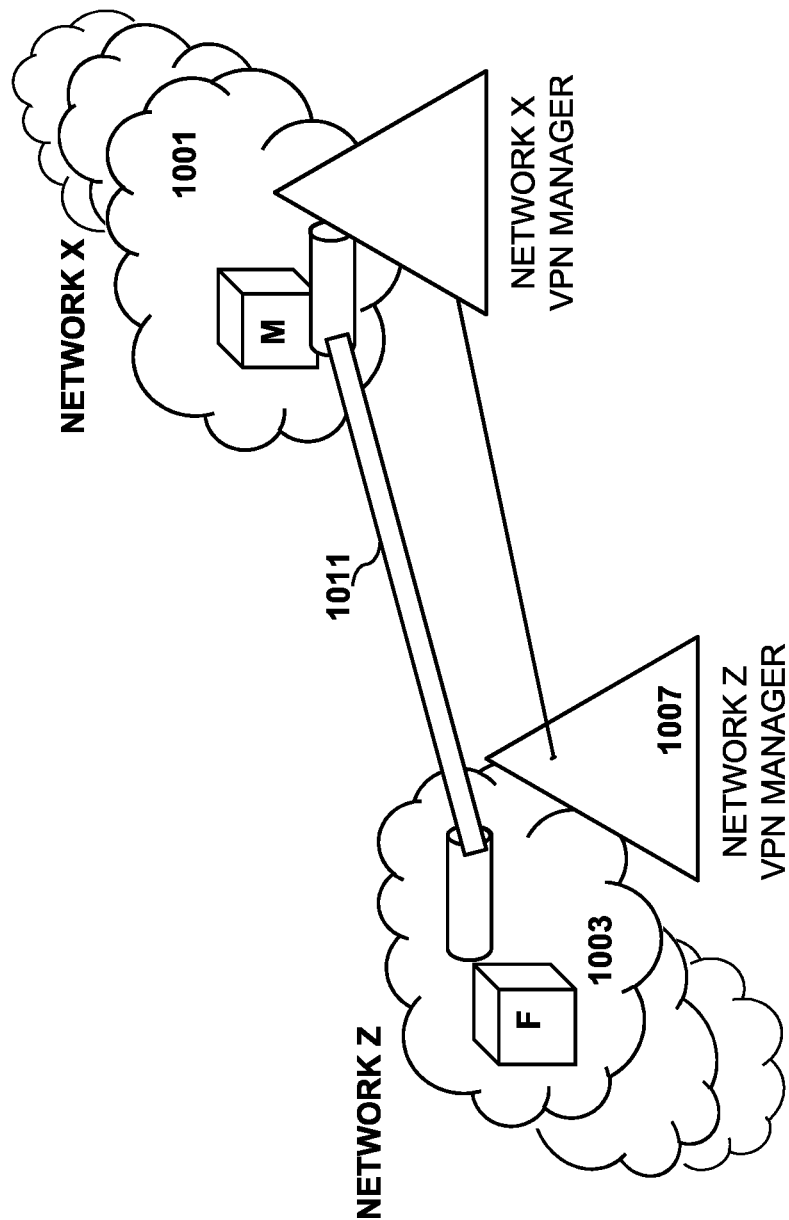
FIG. 10 depicts creating a VPN between cloud environments managed by two different VPN Managers based on a federation model.

One embodiment is illustrated in FIG. 10. An application for a first organization is resident on Machine M in one of a first set of clouds 1001 and needs a VPN tunnel created to communicate with Machine F in one of a second set of clouds 1003 belonging to a different organization. VPN tunnels between machines in set of clouds 1001 are managed by VPN Manager 1005, while VPN tunnels in set of clouds 1003 are managed by VPN Manager 1007.

Then when applications want a VPN tunnel, they make a request to their own VPN provider server, e.g., the application on Machine M contacts VPN Manager 1005. The VPN Manager 1005 would communicate with its counterpart VPN Manager 1007 to set up the new VPN tunnel 1011. Thus, clients would communicate with the other trusted clients using a VPN tunnel to provide an access point and encryption. The VPN tunnel can flow through the central server or the VPN Manager can spawn an additional lightweight tunnel. Similar to the description above for VPN tunnels within a hybrid cloud environment, the VPN tunnels managed between the two cloud environments 1001 and 1003 can be reconfigured, merged and split to accommodate the needs of the applications during their lifecycles.

The above-described subject matter provides many advantages. In preferred embodiments, the merging and splitting of VPN tunnels allows for network optimizations. The VPN Manager can take into consideration available bandwidth, available machine compute, network topology and VPN overhead when making decisions around location and combination of VPNs. The prior art uses dedicated VPN tunnels to provide security between cloud environment. By monitoring the throughput on given VPN tunnels, the VPN Manager can suggest the creation of an additional VPN tunnel to split VPNs handling a large amount of traffic or suggest merging underutilized VPNs terminating at locations within the same cloud.

When integrated into cloud environments, with sufficient privilege, the VPN Manager may automatically deploy a dedicated machine to offload VPN traffic. If the VPN Manager has the credentials of a cloud administrator available, then it can use the credentials to automatically create a VM in the cloud and dedicate it for processing VPN traffic, thus creating a new VPN Manager to share the load. This will help ease the load on the existing machine running the VPN Manager and also makes the VPN Manager more scalable for the hybrid cloud. All or some VPN agents will then start communicating with the new VPN Manager. In another embodiment, the VPN Manager may also offload to a dedicated VPN appliance depending on availability. If the VPN Manager detects a VPN appliance, it can install (or use an already installed) VPN Manager, then in similar fashion to cloud VM, the VPN Manager can start offloading traffic to the VPN appliance to relieve some of the workload on the existing VPN manager. While invention can be largely autonomic in some preferred embodiments of the invention, the administrator may manually tune the VPN tunnels through the user interface. In autonomic embodiments of the invention, a user interface can be provided to alert the administrator of actions taken by the VPN Manager. The administrator can examine the log of events detected by the agents and the subsequent actions taken by or directed to be taken by the VPN Manager to either adjust the autonomic policies or to overrule actions taken by the VPN Manager. The administrator can install physical VPN appliances and configure the VPN Manager to explicitly use those appliances by default.

In alternative embodiments, rather than the agent-based management discussed above, the VPN Manager could leverage cloud APIs or leverage existing agents (such as Chef client agents) to reconfigure the endpoints of the VPN tunnels. In these embodiments, the actions described above as taken by the VPN agents are instead taken by other network entities such as the Chef agents or other VPN controlling mechanisms already resident in the cloud infrastructure. When using the cloud APIs, there could be software based networking available in the cloud which could be used to create VPN tunnels for all VMs connected to a software defined network (SDN), instead of deploying agents on each and every machine.

As discussed above, an application can change the VPN parameters for the VPN tunnel as the lifecycle of the application changes. For example, during an application deployment process, the application may require different communication bandwidth and security protocols. For example, an SSH protocol over the VPN tunnel may be required during the product installation, but not during the product runtime. The application can provide a new set of requirements for dynamic VPN tunnel reconfiguration to the VPN Manager.

The VPN Manager provides dynamic VPN deployment, management and reconfiguration responsive to detailed and dynamic requirements supplied by a set of applications or machines within the organization's networks. By allowing the merger and splitting of multiple flexible VPN tunnels, the efficiency and security of a hybrid cloud is improved.

Further, an organization can use the invention to provide VPN tunneling capabilities with federation with the cloud environment controlled by partners or other trusted entities. Federation of VPN capability through establishment of trust between VPN Managers belonging to different organizations allows applications to leverage existing trust relationships without requiring the application itself to join multiple organizations.

Embodiments of the invention allow changes to the VPN tunnel topology in response to automated deployment and removal of cloud-hosted hardware for more efficient management and to offload VPN activity. The choice of VPN technology is responsive to environment changes and requirements of the requesting applications. By leveraging cloud infrastructure (APIs, automated deployment tools), the VPN Manager can manage VPN tunnels with a minimum of additional infrastructure. Embodiments of the invention responsively change the communication based on application lifecycle, such as real-time changing of allowed protocols based on application-driven commands. By continuously monitoring the VPN tunnel requirements provided by administrator or the set of applications, embodiments of the invention provide for dynamic VPN tunnel reconfiguration.

There are many advantages of the invention over the prior art. The invention provides dynamic VPN deployment, management and reconfiguration responsive to detailed and dynamic requirements supplied by the applications. Moreover, multiple VPN Managers can manage VPNs in different clouds and through federation of VPN capability through establishment of trust between VPN Managers, applications can leverage the existing trust relationship to request a VPN from a trusted VPN Manager from a different cloud.

The combination of multiple flexible VPN tunnels into a single VPN tunnel improves efficiency and security of intercloud communications. If needed, splitting of combined VPNs to meet new demands can also be accomplished. In embodiments of the invention, the hardware used to provide the VPN function is automatically deployed and removed for more efficient management. The VPN technology chosen for creating a given tunnel is responsive to cloud environment and the requirements specified by the application. Where specialized VPN agents are used, the specialized VPN agents are configured to provide the requirements requested by the application or machine requesting a VPN tunnel. The cloud infrastructure itself is flexible, allowing reassignment of tasks between machines. This flexibility can be leveraged in the VPN management process (APIs, automated deployment tools) by assigning such resources dynamically to additional manage VPNs as needed.

The VPN tunnels can be responsively changed to provide for expansion or restriction of the communication channel based on the application lifecycle, as well as real-time changing of the allowed protocols in a VPN tunnel based on application-driven commands. In preferred embodiments of the invention, the VPN agents continuously monitor VPN requirements provided by administrator or the application, or a set of applications, and the actual throughput being demanded by the application, for dynamic VPN reconfiguration. As described, the approach herein may be implemented manually or in an automated manner, in whole or in part.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/WL interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method comprising:
in a first virtual private network (VPN) manager, managing a plurality of VPN tunnels, wherein a respective VPN tunnel provides communication for traffic between a node in a first cloud and a node in a second cloud in a hybrid cloud environment;
receiving a request from a first cloud application resident in the first cloud, the request including a first set of requirements for a first VPN tunnel in the plurality of VPN tunnels;
sending a first VPN manager request to a first system in a first cloud, wherein the first system creates the first VPN tunnel according to the first set of requirements;
receiving a request from a second cloud application resident in the first cloud, the request including a second set of requirements for a VPN tunnel in the plurality of VPN tunnels;
sending a second VPN manager request to the first system in a first cloud, wherein the second VPN manager request contains the second set of requirements; and
wherein the second VPN manager request comprises a selected one of either tuning the first VPN tunnel according to both the first and second set of requirements if the first and second requirements are compatible or creating a second VPN tunnel between the first node and the second node if the first and second requirements are not compatible, the second VPN tunnel created by the first system.

2. The method as recited in claim 1, further comprising:
sending a first VPN agent to the first system;
installing the first VPN agent at the first system; and
wherein the VPN manager sends requests and information concerning management of the first VPN tunnel to the first VPN agent.

3. The method as recited in claim 2, further comprising receiving events pertaining to the first VPN tunnel from the first VPN agent, wherein a first event is selected from the group consisting of receiving a modification request from an application using the first VPN tunnel which includes a second set of requirements for the first VPN tunnel, detecting a change in traffic bandwidth in the first VPN tunnel, a network topology change for the first cloud and a modification request from an application for a change in security requirements for the first VPN tunnel.

4. The method as recited in claim 1, wherein the first and second sets of requirements include respective sets of security requirements.

5. The method as recited in claim 1, wherein the first and second requirements were compatible in the second VPN manager request, further comprising:
receiving a request from a second cloud application resident in the first cloud, the request including a modified second set of requirements, wherein the first and modified second sets of requirements are not compatible;
sending a third VPN manager request to the system in a first cloud, wherein the third VPN manager request contains the modified second set of requirements;
wherein the third VPN manager request comprises splitting the first VPN tunnel into the first VPN tunnel to accommodate traffic from the first cloud application and a second VPN tunnel to accommodate traffic from the second cloud application.

6. The method as recited in claim 1, wherein the first and second requirements were not compatible in the second VPN manager request, further comprising:
receiving a request from a second cloud application resident in the first cloud, the request including a modified second set of requirements, wherein the first and modified second sets of requirements are compatible;
sending a fourth VPN manager request to the system in a first cloud, wherein the fourth VPN manager request contains the modified second set of requirements;
wherein the fourth VPN request comprises merging the second VPN tunnel created according to the second set of requirements with the first VPN tunnel and modifying first VPN tunnel according to the first and second set of requirements.

7. The method as recited in claim 1, further comprising:
establishing a trust relationship between the first VPN Manager which manages a first hybrid cloud environment of a first organization and a second VPN Manager which manages a second hybrid cloud environment of a second organization; and
creating a second VPN tunnel between a first machine in the first hybrid cloud and a second machine in the second hybrid cloud.

8. Apparatus, comprising:
a processor;
computer memory holding computer program instructions executed by the processor for a virtual private network (VPN) agent to manage a plurality of VPN tunnels between nodes in a first cloud and nodes in a second cloud in a hybrid cloud environment, the computer program instructions comprising:
program code, operative to receive a request from a first cloud application resident in the first cloud, the request including a first set of requirements for a first VPN tunnel in the plurality of VPN tunnels;
program code, operative to send a first VPN manager request to a first system in a first cloud, wherein the first system creates the first VPN tunnel according to the first set of requirements;

program code, operative to receive a request from a second cloud application resident in the first cloud, the request including a second set of requirements for a VPN tunnel in the plurality of VPN tunnels;
program code, operative to send a second VPN manager request to the first system in a first cloud, wherein the second VPN manager request contains the second set of requirements; and
wherein the second VPN manager request comprises a selected one of either tuning the first VPN tunnel according to both the first and second set of requirements if the first and second requirements are compatible or creating a second VPN tunnel between the first node and the second node if the first and second requirements are not compatible, the second VPN tunnel created by the first system.

9. The apparatus as recited in claim 8, further comprising:
program code, operative to send a first VPN agent to the first system;
program code, operative to install the first VPN agent at the first system; and
wherein the VPN manager sends requests and information concerning management of the first VPN tunnel to the first VPN agent.

10. The apparatus as recited in claim 9, further comprising program code, operative to receive events pertaining to the first VPN tunnel from the first VPN agent, wherein a first event is selected from the group consisting of receiving a modification request from an application using the first VPN tunnel which includes a second set of requirements for the first VPN tunnel, detecting a change in traffic bandwidth in the first VPN tunnel, a network topology change for the first cloud and a modification request from an application for a change in security requirements for the first VPN tunnel.

11. The apparatus as recited in claim 9, further comprising:
a set of specialized VPN agents; and
program code operative to select a selected VPN agent among the specialized VPN agents according to the first set of requirements.

12. The apparatus as recited in claim 9, wherein the first and second requirements were compatible in the second VPN manager request, further comprising:
program code, operative to receive a request from a second cloud application resident in the first cloud, the request including a modified second set of requirements, wherein the first and modified second sets of requirements are not compatible;
program code, operative to send a third VPN manager request to the system in a first cloud, wherein the third VPN manager request contains the modified second set of requirements;
wherein the third VPN manager request comprises splitting the first VPN tunnel into the first VPN tunnel to accommodate traffic from the first cloud application and a second VPN tunnel to accommodate traffic from the second cloud application.

13. The apparatus as recited in claim 8, wherein the first set of requirements include a first set of security requirements and the second set of requirements include a second set of security requirements and the apparatus further comprises program code operative to determine whether the first and the second sets of security requirements are compatible.

14. The apparatus as recited in claim 10, wherein an event is detecting an application lifecycle change of the first cloud application.

15. The apparatus as recited in claim 10, wherein the program code operative to monitor events in the first VPN tunnel further comprises:

program code, operative to determine whether a lower threshold of traffic bandwidth has been crossed in the first VPN tunnel;

program code, operative to determine whether an upper threshold of traffic bandwidth has been crossed in the first VPN tunnel; and program code, responsive to a determination that a threshold has been crossed to send a message to the VPN manager.

16. A computer program product in a non-transitory computer readable medium for use in a data processing system, the computer program product holding computer program instructions executed by the processor to manage a plurality of VPN tunnels between nodes in a first cloud and nodes in a second cloud in a hybrid cloud environment, the computer program instructions comprising:

program code, operative to receiving a request from a first cloud application resident in the first cloud, the request including a first set of requirements for a first VPN tunnel in the plurality of VPN tunnels;

program code, operative to send a first VPN manager request to a first system in a first cloud, wherein the first system creates the first VPN tunnel according to the first set of requirements;

program code, operative to receive a request from a second cloud application resident in the first cloud, the request including a second set of requirements for a VPN tunnel in the plurality of VPN tunnels;

program code, operative to send a second VPN manager request to the first system in a first cloud, wherein the second VPN manager request contains the second set of requirements; and wherein the second VPN manager request comprises a selected one of either tuning the first VPN tunnel according to both the first and second set of requirements if the first and second requirements are compatible or creating a second VPN tunnel between the first node and the second node if the first and second requirements are not compatible, the second VPN tunnel created by the first system.

17. The computer program product as recited in claim 16, further comprising:

program code, operative to sending a first VPN agent to the first system;

program code, operative to installing the first VPN agent at the first system; and wherein the VPN manager sends requests and information concerning management of the first VPN tunnel to the first VPN agent.

18. The computer program product as recited in claim 16, wherein a change in security requirements for the first cloud application causes a VPN manager request for the first VPN tunnel to be split into a first and a second VPN tunnel by the first system.

19. The computer program product as recited in claim 16, further comprising program code operative to receive events pertaining to the first VPN tunnel from the first VPN agent, wherein a first event is selected from the group consisting of receiving a modification request from an application using the first VPN tunnel which includes a second set of requirements for the first VPN tunnel, detecting a change in traffic bandwidth in the first VPN tunnel, a network topology change for the first cloud and a modification request from an application for a change in security requirements for the first VPN tunnel.

20. The computer program product as recited in claim 16, further comprising program code operative to remove the first VPN tunnel at an end of a first cloud application lifecycle.

* * * * *